Aug. 17, 1926.
S. H. COONEY
1,596,810
INDIVIDUAL GLARE DIMMER
Filed June 28, 1924     2 Sheets-Sheet 1
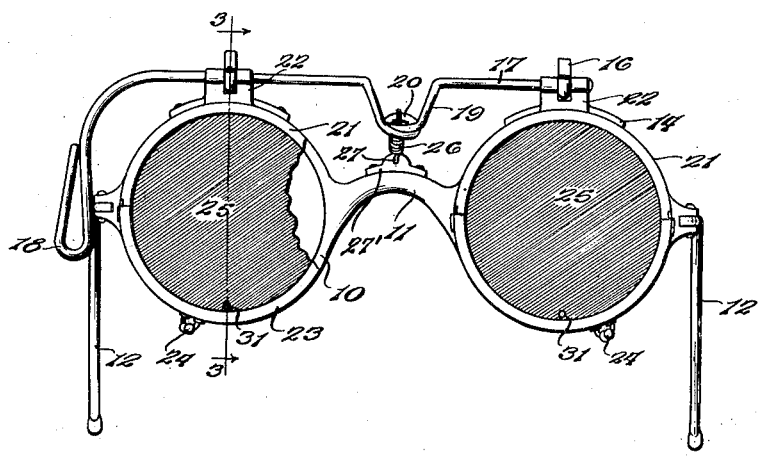
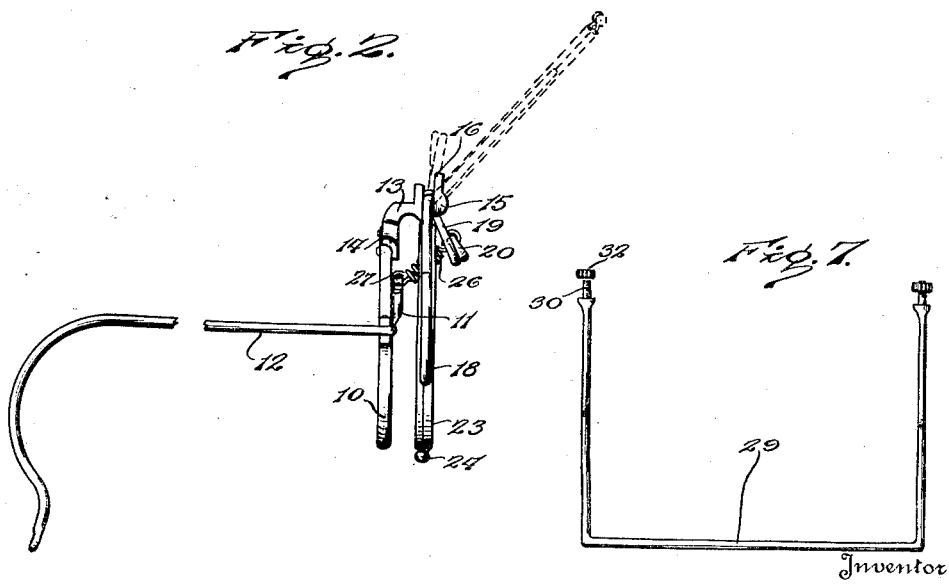
Inventor
S. H. Cooney
By Lacey & Lacey, Attorneys Aug. 17, 1926.
S. H. COONEY
INDIVIDUAL GLARE DIMMER
Filed June 28, 1924    2 Sheets-Sheet 2
1,596,810
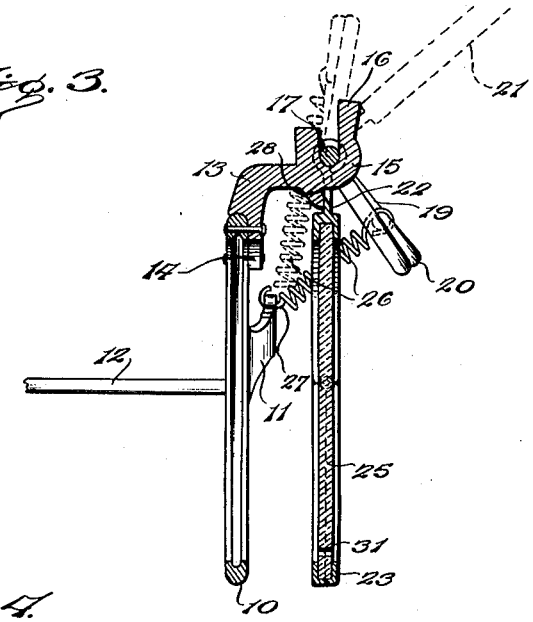
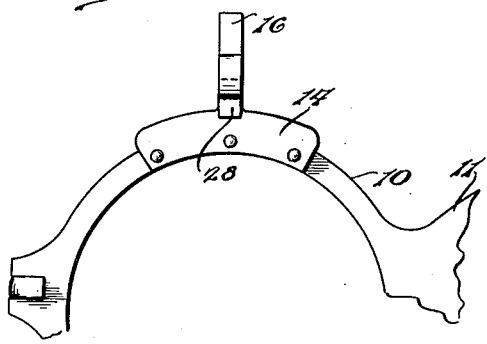
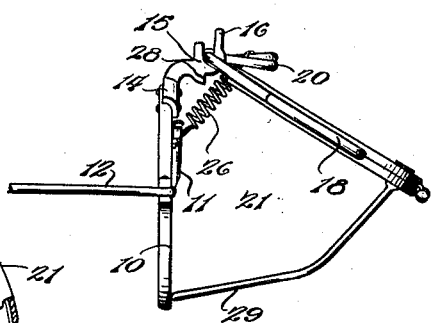
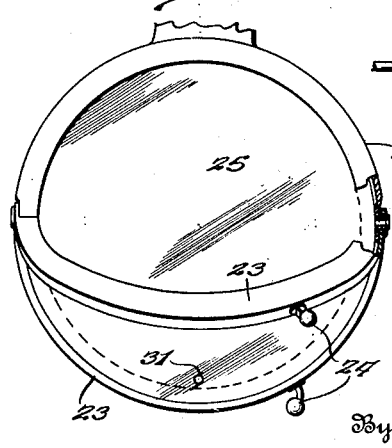
Inventor
S. H. Cooney
By Lacey & Lacey, Attorneys Patented Aug. 17, 1926.

1,596,810

UNITED STATES PATENT OFFICE.

SPENCER H. COONEY, OF McGUFFEY, OHIO.

INDIVIDUAL GLARE DIMMER.

Application filed June 28, 1924. Serial No. 722,960.

This invention relates to an improved individual glare dimmer especially designed for use by motorists and seeks, among other objects, to provide a device which may be worn by the motorist and disposed in front of the eyes when desired, for dimming the glare of the headlights of an oncoming vehicle or dimming the glare of the sun.

The invention seeks, as a further object, to provide a device which may be mounted upon an ordinary pair of spectacles and wherein, when desired, the dimmer may be swung upwardly out of the field of vision.

The invention seeks, as another object, to provide a device wherein the dimmer may be yieldably held in lowered position for use as well as in elevated inactive position and wherein the dimmer may, when desired, be readily detached from the spectacles.

A further object of the invention is to provide a dimmer wherein the dimming glasses or other transparencies employed may be readily removed from the rims therefor so that the user of the device may readily substitute one pair of transparencies for another as may best suit the needs of the user.

And the invention seeks, as a still further object, to provide a device which, while being particularly adapted for use by motorists or others desiring an individual glare dimmer, may be equipped with magnifying lenses and employed by theater patrons in lieu of opera glasses.

Other and incidental objects will appear hereinafter.

In the accompanying drawings:

Figure 1 is a front elevation of my improved glare dimmer,

Figure 2 is an edge elevation of the device,

Figure 3 is an enlarged detail sectional view on the line 3—3 of Figure 1, looking in the direction indicated by the arrows.

Figure 4 is an enlarged elevation showing the mounting of the dimmer brackets,

Figure 5 is an enlarged elevation showing the manner in which the dimmer transparencies may be removed from the rims therefor, Figure 6 is an edge elevation particularly showing the use of a spacer in connection with the dimmer adapting the device for use as an eye shade, and Figure 7 is a detail elevation of the spacer.

In carrying the invention into effect, I employ an appropriate spectacle frame embodying rims 10 connected by a nose bridge 11 and hinged to the rims are templets 12. Mounted upon the spectacle rims 10 at their upper sides are forwardly projecting brackets 13 provided at their inner ends, as shown in Figure 4, with flanges 14 riveted or otherwise secured to the rims and formed on the brackets at their outer ends are upstanding U-shaped yokes 15, the outer sides of which are elongated to produce stop members 16.

In conjunction with the brackets 13, I employ a dimmer frame including a shaft 17 provided at one end with a laterally directed handle 18 and bent to form a medially disposed arm 19 having an eye 20. Rigidly connected with the shaft is a pair of rims 21 provided at their upper sides with yokes 22 which are fixed to the shaft 17 so that when the shaft is turned, the rims 21 will swing therewith. As will be observed, the shaft 17 is journaled in the yokes 15 of the brackets 13 while the yokes 22 are formed to straddle the yokes of the brackets limiting the shaft against endwise movement.

As shown in detail in Figure 5, the rims 21 each comprise an upper semi-circular portion to the ends of which are pivotally connected a pair of mating lower semi-circular sections 23 carrying coacting headed spring catch members 24 normally holding the sections closed, and mounted within the rims are dimming transparencies 25 which may be of glass, celluloid or other approved material. As will be seen, by swinging the sections 23 of each of the rims apart, the transparencies may be readily removed so that a dark colored transparency, for instance, may be easily substituted for a lighter transparency, as may best meet the needs of the user. Looped at one end through the eye 20 of the arm 19 of the dimmer shaft 17 is a spring 26 which is provided at its opposite end with a hook 27 and screwed upon the bridge 11 of the spectacles is an anchoring member 27' apertured to removably receive said hook. The spring will thus serve to swing the dimmer frame downwardly and formed on the brackets 13 to coact with the yokes 22 are, as particularly shown in Figure 3, stop lugs 28 limiting the frame in its downward active position.

As will now be seen, a motorist may wear the spectacles in the usual manner so that the motorist may, when meeting an oncoming vehicle, swing the dimmer frame downwardly to dispose the transparencies 25 in front of the eyes for dimming the glare of the headlights of the vehicle. After the vehicle has passed, the handle 18 may be grasped and the dimmer frame swung upwardly, as shown in dotted lines in Figure 3, to inactive position limited by the stop lugs 16. Thus, except when the dimming transparencies are actually needed, said transparencies may be disposed out of the field of vision and, in this connection, it is to be observed that when the frame is swung upwardly, the spring 26 will cross the pivotal center of the shaft 17 for holding the frame in elevated position.

The yokes 15 provide upwardly opening bearings for the shaft 17 which is dropped into position from above. The spring 26 exerts a down pull upon the shaft 17 to retain it in the bearings 15, besides holding the transparencies lowered or elevated, as shown by the full and the dotted lines in Figures 2 and 3.

In conjunction with the dimmer frame, I provide a spacer 29, shown in detail in Figure 7 of the drawings. The spacer is substantially U-shaped and is provided at its ends with studs 30 while the transparencies 25 are formed near the lower sides thereof with openings 31 to receive said studs so that nuts 32 may be applied to the studs for securing the spacer to the transparencies. Thus, when the dimmer frame is swung down, the spacer 29 will, as shown in Figure 6, abut the rims 10 of the spectacles for limiting the transparencies 25 in forwardly and downwardly inclined position with respect to the said rims so that the transparencies will then serve as a shade for the eyes, and, if desired, opaque members may be substituted for the transparencies. As will, of course, be understood, suitable lenses may be mounted in the rims 10 of the spectacles should the user of the device require such lenses, and by detaching the hook 27 from the bridge 11 the shaft 17 may be lifted upwardly from within the yokes 15 and the dimmer frame removed so that the spectacles may be worn in the usual manner without the dimming transparencies.

Having thus described the invention, what I claim is:

1. In combination a spectacle frame, brackets extended upwardly and forwardly from the rims thereof and terminating in upwardly opening bearings, a shaft detachably mounted in said upwardly opening bearings, rims carried by the shaft and adapted to receive transparent elements, and an upwardly and forwardly inclined spring connecting the shaft with the spectacle frame and serving to retain the shaft in the said upwardly opening bearings with the rims thereof either elevated or lowered.

2. In combination a spectacle frame, brackets projecting from the tops of the rims thereof and terminating in upwardly opening bearings, a shaft detachably mounted in the upwardly opening bearings of the brackets and having an offstanding arm, elements carried by the shaft and coacting with the said brackets to prevent longitudinal movement of the shaft, rims projected from the shaft and adapted to receive transparent elements, and a spring between the arm of the shaft and the nose bridge of the spectacle frame exerting a downward pull upon the shaft to hold it in the upwardly opening bearings of the said brackets with the rims thereof either elevated or lowered.

3. In combination, a spectacle frame, brackets extended upwardly and forwardly from the rims thereof and terminating in upwardly disposed yokes having a forward member projected to form upper stops and having depending lugs forming lower stops, a shaft detachably mounted in the said yokes and having its intermediate portions bent to provide an arm, rims carried by the shaft, yokes on the shaft straddling the yokes of the brackets and adapted to coact with the said upper and lower stops, and a spring between the arm of the shaft and the nose bridge of the spectacle frame to hold the shaft in place with the rims thereof either elevated or lowered.

4. An individual dimmer including a spectacle frame, brackets mounted upon the frame to project forwardly therefrom and provided with yokes, a dimmer frame including a shaft journaled in said yokes and freely removable therefrom, dimming transparencies carried by the dimmer frame, and a spring extending between the spectacle frame and said shaft for holding the dimmer frame in downward position or in upward inactive position as well as holding the shaft against accidental displacement from said yokes.

5. An individual dimmer including a spectacle frame embodying a nose bridge, brackets mounted upon the frame to project forwardly therefrom and provided with yokes, a dimmer frame including a shaft journaled in said yokes and bent to form an arm, dimming transparencies carried by the dimmer frame, and a spring extending between said bridge and said arm for rotating the shaft and removably holding the shaft engaged in said yokes.

6. An individual dimmer including a spectacle frame, brackets fixed upon the frame to project forwardly therefrom, a dimmer frame swingingly supported by said brackets, dimming transparencies carried by the dimmer frame, and a substantially U-shaped spacer carried by the dimmer frame to abut the spectacle frame for limiting the dimmer frame in forwardly and downwardly inclined position with respect to the spectacle frame.

7. An eye-glass frame comprising complemental rim sections, one of the sections consisting of similar mating members which are pivoted to one another and to the companion section, and a catch for securing the pivoted members in closed position.

In testimony whereof I affix my signature.

SPENCER H. COONEY. [L. S.]